C. G. BIEDINGER.
Paper-Bag Machines.

No. 148,280. Patented March 10, 1874.

Fig. 1

Enlarged view of Guide R and Feed Belts

Attest

Inventor
Charles G. Biedinger
By F. Millward
Attorney

C. G. BIEDINGER.
Paper-Bag Machines.

No. 148,280. Patented March 10, 1874.

Fig. 2

Attest
Ph. Thater
J. K. Linn

Inventor
Chas. G. Biedinger.
By F. Millward.
Attorney.

AM. PHOTO-LITHOGRAPHIC Co. N.Y. (OSBORNE'S PROCESS)

C. G. BIEDINGER.
Paper-Bag Machines.

No. 148,280.  Patented March 10, 1874.

Fig. 3

Attest

Inventor
Charles G. Biedinger
By H. Millward
Attorney

C. G. BIEDINGER.
Paper-Bag Machines.

No. 148,280. Patented March 10, 1874.

Attest
Rob H Winter
J. K. Linn

Inventor
Charles J. Biedinger.
By F. Millward.
Attorney

AM. PHOTO-LITHOGRAPHIC Co. N.Y. (OSBORNE'S PROCESS)

C. G. BIEDINGER.
Paper-Bag Machines.

No. 148,280.          Patented March 10, 1874.

Attest

Inventor
Charles G. Biedinger
By F. Millward
Attorney

C. G. BIEDINGER.
Paper-Bag Machines.

No. 148,280.   Patented March 10, 1874.

Attest

Inventor
Charles G. Biedinger
By F. Millward
Attorney

C. G. BIEDINGER.
Paper-Bag Machines.

No. 148,280. Patented March 10, 1874.

Attest

Inventor
Charles G. Biedinger
By F. Millward
Attorney

C. G. BIEDINGER.
Paper-Bag Machines.

Patented March 10, 1874.

Attest

Inventor
Charles G. Biedinger
By H. Millward
Attorney

C. G. BIEDINGER.
Paper-Bag Machines.

No. 148,280. Patented March 10, 1874.

UNITED STATES PATENT OFFICE

CHARLES G. BIEDINGER, OF CINCINNATI, OHIO.

IMPROVEMENT IN PAPER-BAG MACHINES.

Specification forming part of Letters Patent No. 148,280, dated March 10, 1874; application filed July 19, 1873.

*To all whom it may concern:*

Figure 11:
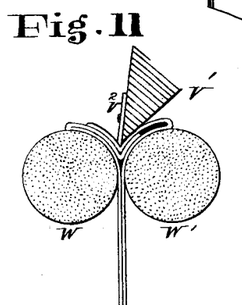
Fig. 11 is a vertical section through one of the folding-cams and discharging-rollers, showing the folding-cam armed with a sliding knife, which I prefer to use for the purpose of making an accurate central fold, and for forcing the finished bag through the discharging-rollers.

Be it known that I, CHARLES G. BIEDINGER, of Cincinnati, Hamilton county, State of Ohio, have invented a certain new and useful Machine for Making Paper Bags, of which the following is a specification:

My invention relates to the class of machines designed to manufacture the style or kind of paper bags known to the trade as "satchel-bottom," for flour-sacks and general use; and my invention consists of the provision of peculiarly constructed and operating mechanism at the different stages of the formation of the bag, which may be enumerated as follows: First, in combination with cutting-off shears and a paper roll for the supply of the machine, of feed-rolls so constructed and operating that they have a uniform speed while feeding, but are operated so as to stop instantly to permit the cutting-off shears to pass through the paper and back before the feeding is resumed; second, of a tube-forming skeleton cylinder so fitted with two pairs of nippers and series of eccentric rollers that the edge of the paper is grasped from the feed-rollers by each pair of nippers alternately, and carried around it so that a tube is formed thereby, the curvature being in the direction of the fiber of the paper, and when formed and pasted the tube is released so as to permit the action of gravitation to carry the tube to the bottom-folding devices, the releasing being accomplished by automatic devices acting to decrease the radial distance of the carrying-rollers, in this cylinder, from the axis of the cylinder in proper time; third, in combination with this forming-cylinder of a fountain pasting-cylinder operating in such a way as to apply the paste to the flap of the tube as it is wound around by the forming-cylinder; fourth, of a combination of a vertical suspended guide inside the tube with feeding-belts upon the outsides of the same, whereby the tube of paper is delivered in proper shape to the bottom-folding devices, the guide having in its interior a hollow plunger, serving to apply the paste to and crease the seams of the satchel-bottom; fifth, of peculiar mechanism whereby the feeding-belts are moved to and from contact with the guide, so as to open a space for the reception of the tube of paper between them, and to permit the timing of the feed; sixth, in connection with the guide for the tube of paper, of spring-fingers acting to spread the tube flat for proper delivery to the bottom-folding devices, and assist in the bottom folding; seventh, of a pair of peculiarly formed and operating revolving seaming or folding cams and elastic delivering-rolls, whereby, in combination with side folders and pasting-plungers, the satchel-bottom seams are completely folded, pasted, and the finished bag delivered; eighth, of a peculiar formation of the revolving bottom-seaming cams; ninth, in connection with the hollow pasting-plunger, of a cam, levers, and side rods for giving the proper reciprocating motion to the plunger in proper time for pasting and folding the bottom seams; tenth, of a device for operating the delivery-rollers so as to enable them to stop in proper time for the folding of the bottom seams upon them, and move at proper time for the delivery of the finished bag; eleventh, in connection with the delivering-rollers and folding-cams, of a reciprocating knife operating to crease and double up in the proper central line the satchel-bottom for the folding of the flaps over in the act of passing through the delivering-rollers, so that the bags are delivered with the bottoms doubled together, as shown in progress in Fig. 11, for convenient printing, package, and shipment; twelfth, of the provision of a pair of rollers between the forming-cylinder and feed-roller, which performs the double function of properly presenting the paper to the nippers of the forming-ing cylinder and to press the side seam of the tube down after it is pasted; thirteenth, of the combination of cam-collars on ends of the folding-cams, loose pulleys, or idlers on the ends of the delivering-rollers, and weight or spring devices, which serve to preserve the delivering-roller at the proper distances from the folding-cams; fourteenth, of a combination of lever, cam, and spring devices for giving the necessary motion to the side folders of the bottom seaming or folding devices.

Figure 1:
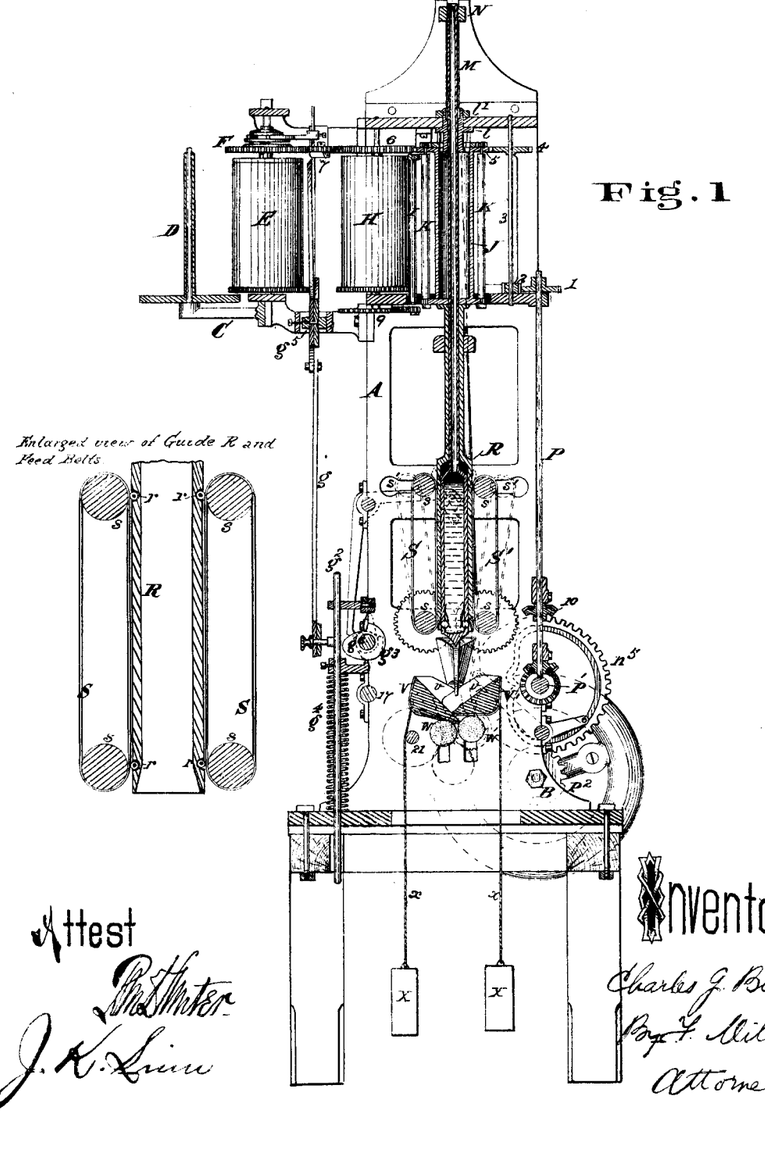
Figure 1 is a section through the center of the machine vertically.
Figure 2:
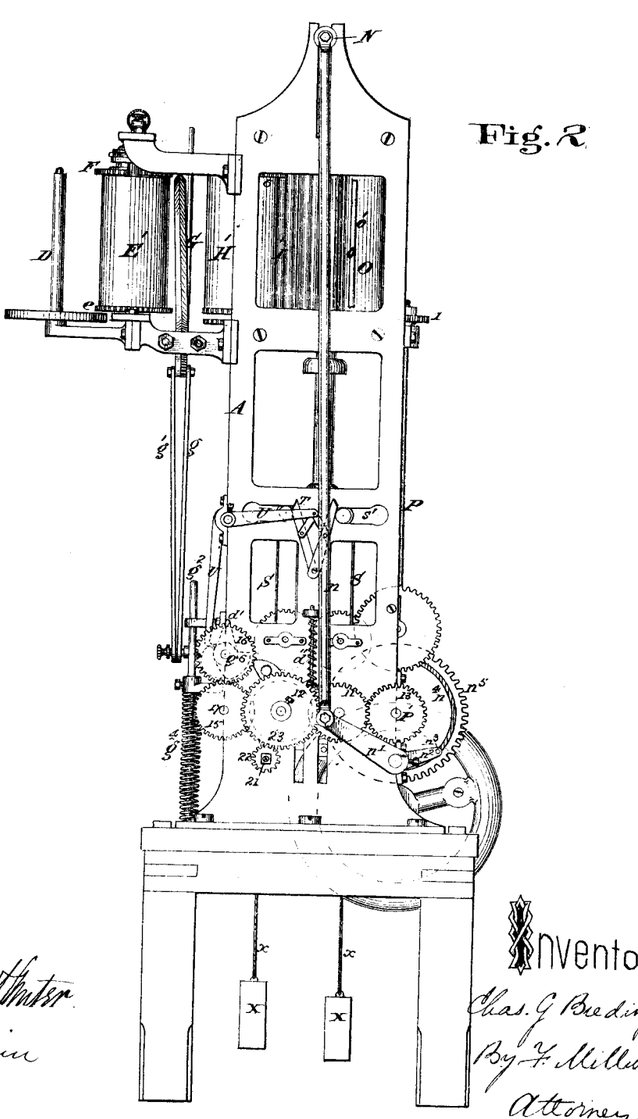
Fig. 2 is a side elevation upon one side of the machine.
Figure 3:
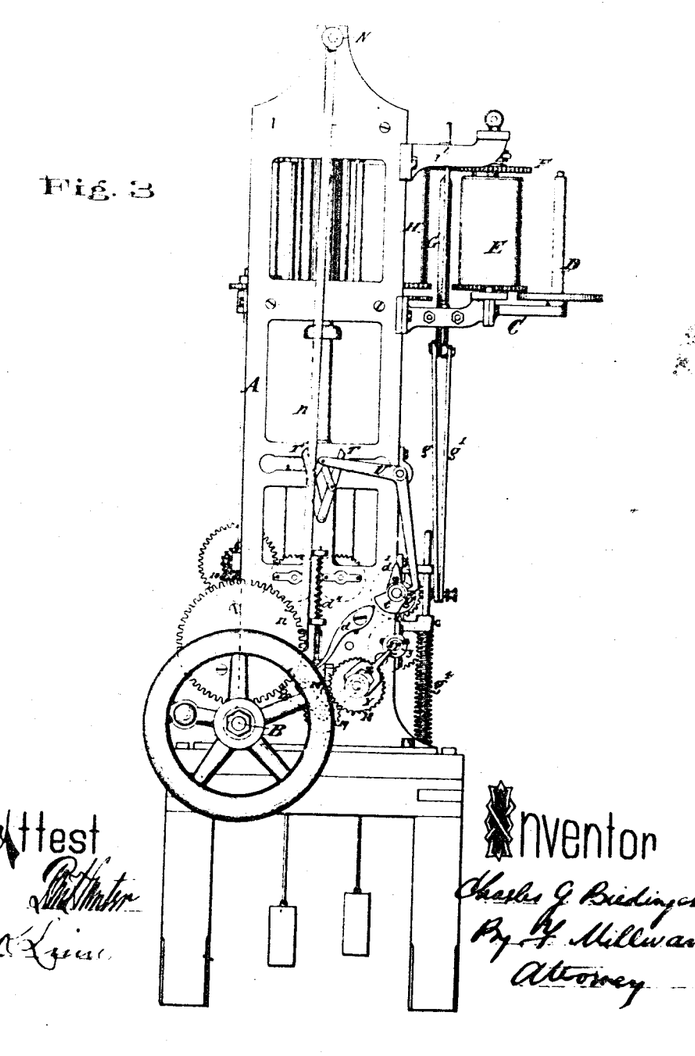
Fig. 3 is a side elevation of the opposite side of machine.
Figure 4:
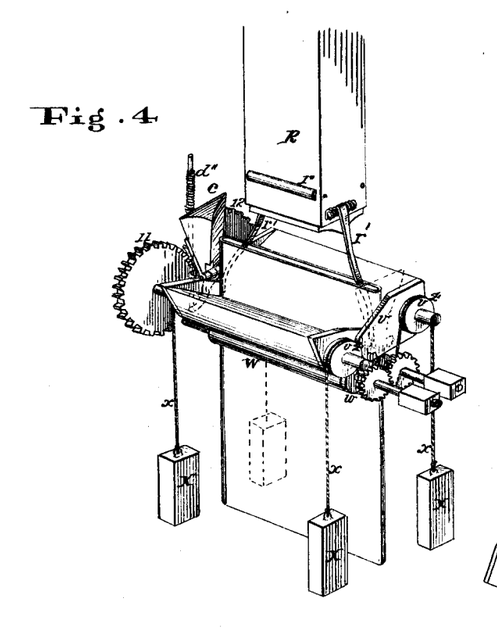
Fig. 4 is a perspective view of the mechanism for forming the bottom of the sack or bag.
Figure 5:
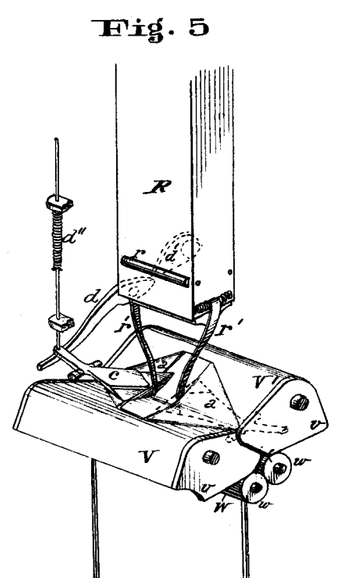
Fig. 5 is a perspective view of a portion of the mechanism for forming the bottom, showing the devices in the act of forming the preliminary folds of the satchel-bottom.
Figure 6:
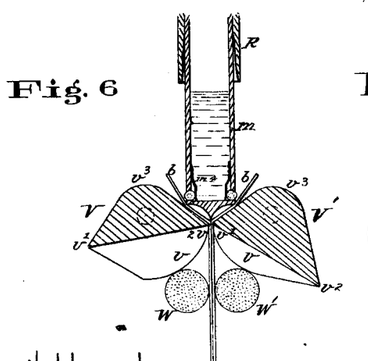
Fig. 6 is a vertical section through the cams for forming the bottom of the bag, in connection with the pasting-plunger and discharging-rollers, in position for the commencement of the formation of the side flaps of the bottom.
Figure 8:
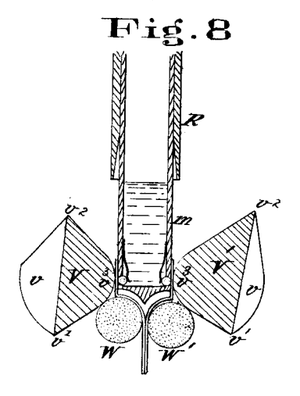
Fig. 8 is a section of same parts, showing the pasting-plunger in the act of rising to enable the folding-cams to turn over the side flaps of the bottom.
Figure 9:
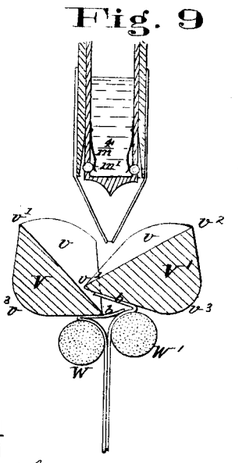
Fig. 9 shows, in section, the same parts, with the plunger elevated and the folding-cams in the act of folding over the side flaps of the bottom of the bag, and a new tube being passed down over the stationary guide to take the place of the bag just being completed.
Figure 10:
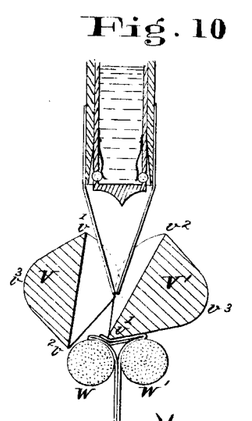
Fig. 10 is a similar section of the same parts, exhibiting one of the folding-cams in the act of pressing the side flaps of the bottom of the bag together, preparatory to their being doubled up for delivery through the discharging-rollers.
Figures 12, 13, 14, 15, 16:
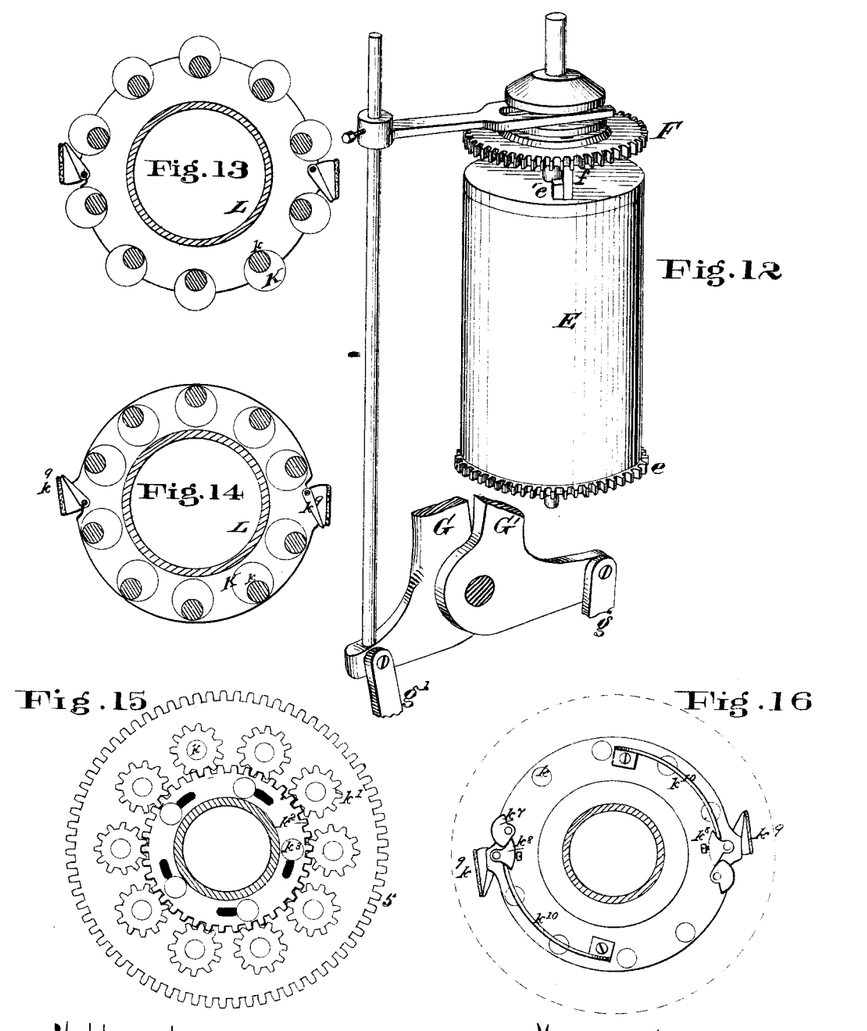
Fig. 12 is a perspective view of the driving feed-roller for the paper in entering the machine, showing also a portion of the cutting-off shears, and a device for stopping the feed-rollers when the shears are cutting off.
Figs. 13 and 14 show cross-sections of the tube-forming cylinder, one figure showing the same expanded in position for carrying the paper round for the formation of the tube, and the other figure showing the same contracted for the discharge by gravity of the pasted tube.
Fig. 15 is a plan of the top gearing of the tube-forming cylinder, showing the device for expanding and contracting the tube-forming cylinder.
Fig. 16 is a plan of the under side of the tube-forming cylinder, showing the devices for operating the nippers in the said cylinder.
Figure 17:
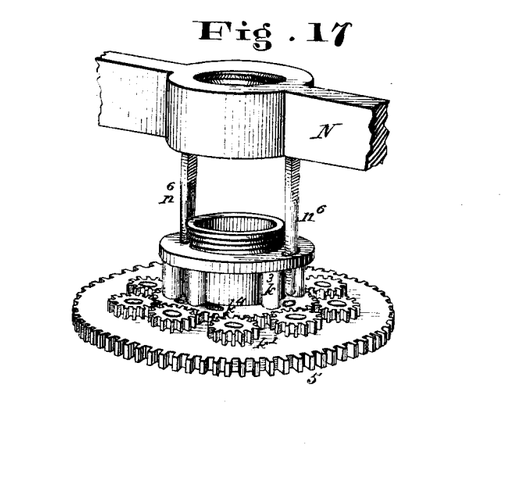
Fig. 17 is a perspective view of the upper gearing of the tube-forming cylinder, showing the projecting pins of the plunger cross-head, which operate to set the gearing of the tube-forming cylinder-rollers in motion.
Figure 18:
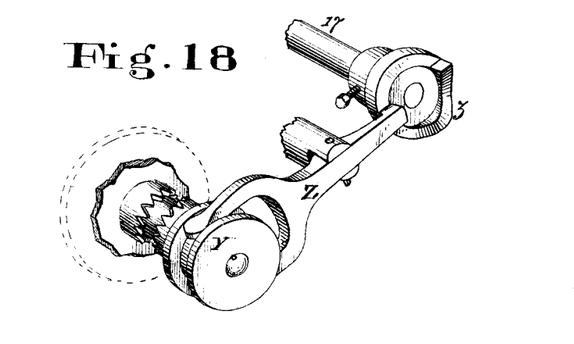
Fig. 18 is a perspective view of the clutch and cam for giving motion, at the proper time only, to the discharging-rollers.
Figure 19:
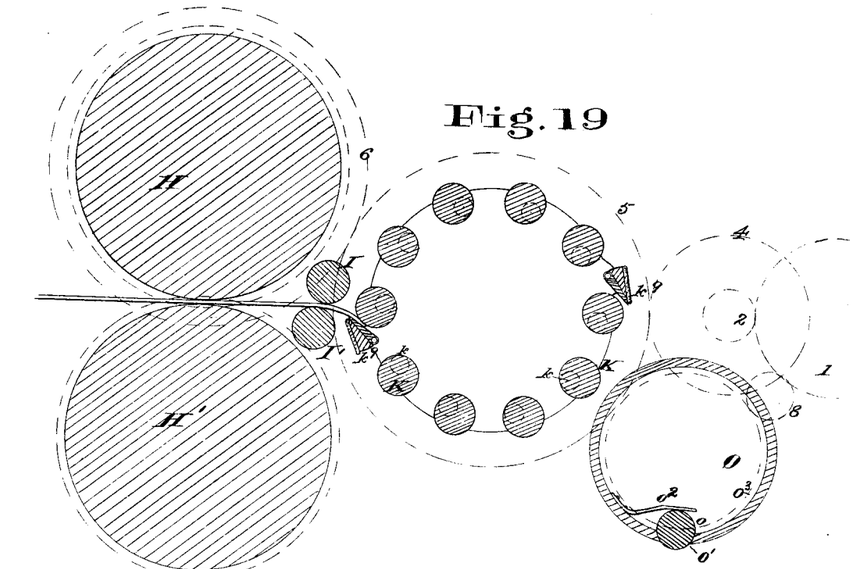
Figs. 19 and 20 are cross-sections of the top of the machine, showing the feed-roller, the forming-cylinder, and pasting-roll in two different stages of operation.
Figure 20:
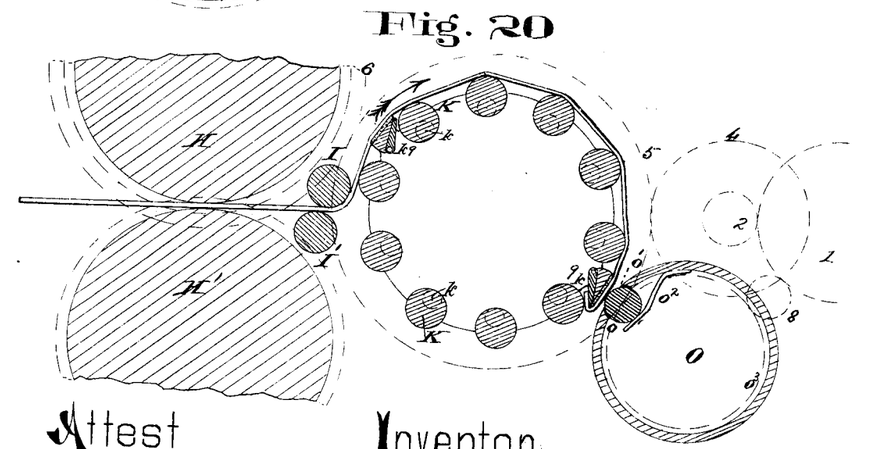
Figure 21:
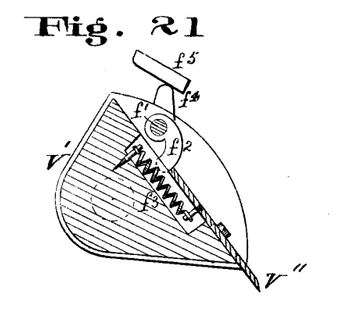
Fig. 21 is a cross-section of the folding-cam for forming the bottom flaps, which carries the knife for crowding the bottom into the discharging-rollers, this figure showing the devices for giving the necessary reciprocating movement to the knife.
Figure 22:
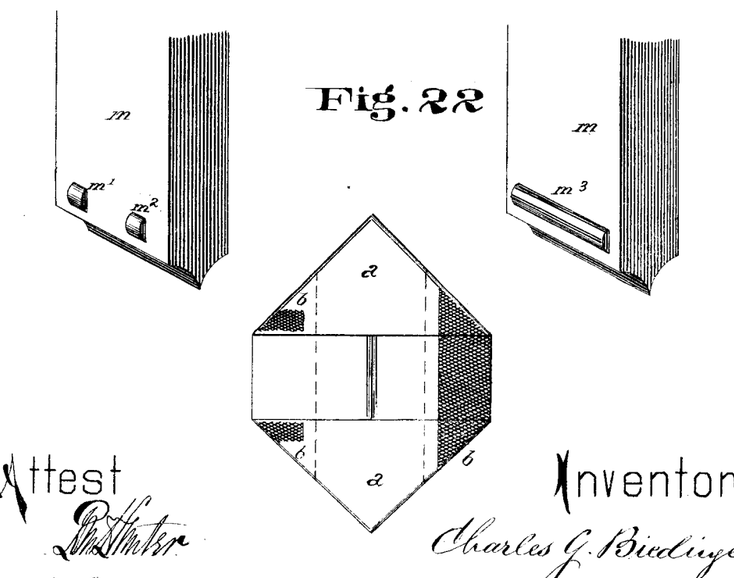
Fig. 22 shows a plan of the bottom of the bag, and illustrates how the paste is applied, and shows also, by detached perspective views of the reverse sides of the pasting-plunger, how the pasting-rollers are disposed, so as to apply the paste properly.

A is the frame of the machine, and B the driving-shaft, to which the power may be applied. Upon a bracket, C, a reel, D, is carried, upon which the paper-roll is supported, and from which the paper is drawn off to feed the machine. E E' are a pair of feed-rollers, which carry the paper from the paper-roll into the machine to be formed and pasted. They are geared together by wheels $e$, and driven by gear-wheel F, which connects, by opposite pins $f$, with projecting opposite pins $e'$ upon the feed-roller E, so as to form a clutch. This clutch is elevated, so as to detach the driving feed-roller from its driving-wheel at a time when the paper is to be cut off to length for the formation of tubes. G G' are the shears, which are similar in character and operation to a common pair of shears or scissors. They are operated by pitmen $g$ $g^1$ and a reciprocating rod, $g^2$, which is raised and lowered by a cam, $g^3$, and spring $g^4$, and one of the arms of the shears carries the fork of the clutch-wheel F, as shown in Fig. 12, the shears being pivoted at $g^5$ to the bracket C, in the manner shown in Fig. 1. Another pair of feed-rollers, H H', are located in the frame, and operated so as to carry the blank to the forming-cylinder through the medium of two other feed-rollers, I I', of small diameter, so as to deliver the edge of the paper so close to the forming-cylinder as that the nipper in it may grasp the edge at the proper time. The forming-cylinder is composed of a hollow trunk, J, with heads at top and bottom, upon the upper of which are journaled a series of revolving rolls or spindles, whose peripheries are eccentric to the journals upon which they revolve, as clearly shown in Figs. 13, 14, 19, and 20, wherein the body of the spindle or roller is represented by the letter K and the journals by $k$. The journals extend through the head on the upper side, and have fitted thereon pinions $k^1$, which gear into a crown-wheel, $k^2$, common to all, in the manner clearly shown in Fig. 15. The crown-wheel is provided with guide-projections $k^3$, which revolve under the shoulder $l$. The shoulder $l$ is firmly supported against the frame of the machine by the nut $l'$, as shown in Fig. 1. A hollow shaft, M, which carries paste to the hollow pasting-plunger, hereinafter explained, is reciprocated vertically through the center of the forming-cylinder by connection with the cross-head N, operated by side rods $n$, lever $n^1$ on the same shaft with short lever $n^2$, the small pin $n^3$ of which is carried in an irregular cam-groove, $n^4$, in wheel $n^5$. Pins $n^6$, projecting from cross-head N, are, in the operation of the cross-head, arranged to enter at the proper time between the projections $k^3$ and into the apertures $k^4$ in the crown-wheel so as to stop the crown-wheel from revolving, and thus cause the rollers or spindles, by reason of their eccentricity with relation to the journals, to assume, collectively, a different diameter of forming-cylinder. By this means the cylinder is expanded or contracted, so as in the first place to be of a size suitable for the tube of paper to be formed upon it, and, in the second place, of the reduced diameter to permit the finished tube to fall therefrom by gravity. Two of the rollers or spindles K have at their lower ends small cams $k^7$ attached, which operate the triangular arms $k^8$ of a pair of nippers, $k^9$, which close against a pair of rollers, K, in the manner shown in Figs. 19 and 20, so as to gripe the edge of the paper. The paper is carried by these nippers, and in the rotation of the cylinder the tube is formed, as is obvious, with the fiber of the paper in the direction of the rotation, which I have proved by experience to be the strongest disposition of paper in the formation of paper bags. The cams $k^7$ operate to open the nippers at the proper time, and the springs $k^{10}$ operate to close them. In connection with the forming-cylinder, a hollow pasting-cylinder, O, is arranged to operate in such relation that the paste is deposited on the side seam of the tube against the back of one of the nippers, as shown in Fig. 20, so that when the other edge of the paper is swept round it may be pressed down flat over the pasted portion by the action of the small feed-roller I. The pasting device of this cylinder consists of a long roller, $o$, operating in a long slot, $o^1$, so that its surface projects beyond the face of the cylinder, in the manner shown in Fig. 20. It is retained in place by a spring, $o^2$, and as this hollow cylinder is filled with paste, and the cylinder rotated in the operation of the machine, the small paste-roller, as it strikes the face of the nippers, is caused to partially rotate, and thus carry out a fresh supply of paste for the next seam. The vertical shaft $p$ is operated by bevel-gearing upon shaft $p^1$, which is rotated through wheel $n^5$ by the pinion $p^2$ of the main shaft B. The wheel 1, on the upper end of shaft $p$, operates pinion 2 on shaft 3. Wheel 4, on shaft 3, gears into and drives the large wheel 5 on the forming-cylinder, which, in turn, gears into the wheel 6 on one of the feed-rollers H, which gears, through a pinion, 7, into and drives the wheel F on the feeding-cylinder E, and a gear-wheel, 9, on the bottom end of feed-roller H, drives, through an intermediate pinion, one of the small feed-rollers I, which are geared together. Wheel 1 also, through pinion 8, drives the wheel $o^3$ on paste-cylinder O, near $q$. Suspended from the frame, below the hollow trunk J, is a stationary guide, R, of rectangular shape horizontally, as shown in Figs. 4 and 5. The paper tube, as it falls from the forming-cylinder by gravity, surrounds this guide, and is fed down at the proper time, by the pressure and motion of the feeding-belts S S', against the faces of the opposing rollers $r$ in the guide R, (see enlarged view in Fig. 1,) the belts being supported upon rollers $s\ s\ s\ s$, and geared together at the bottom, and operated by suitable gearing from the bevel-wheel 10. At the upper end of the feeding-belts the rollers are laterally adjustable in slots $s^1$, and are given a reciprocating motion laterally, so as to stop or start the feed at the proper time by means of vibrating fingers T and bell-crank lever U, operated by the cam $t$, on the shaft $g^6$, which carries the cam $g^3$. V V' are two continuously-revolving cam-shaped folders for operating, in connection with side flaps and pasting-plunger, to fold the bottom of bag. They receive the bag, in the manner shown in Fig. 4, from the spring-fingers $r'$, attached to the stationary guide R, the fingers serving to flatten out or spread the paper flat, so as to make side folds in the tube of paper as it is fed down by the feeding-belts over the guide R. The folding-cams are journaled in fixed bearings, and geared together outside the frame by gear-wheels 11 and 12, (shown clearly in Fig. 4,) and also by strong and dotted lines in Fig. 2, the wheel 11 receiving the power from wheel 13 upon shaft $p'$, which carries the wheel $n^5$, and the wheel 12 communicates motion through wheel 15 on the shaft 17, and wheel 16 to the shaft $g^6$, which operates the cams, as before described. The location of these folding-cams, at different stages of the operation of forming the bag, is clearly illustrated in the large Figs. 6, 7, 8, 9, 10, and 11. At the ends of the folding-cams thin flanges $v$ are attached, which rest upon loose pulleys or idlers $w$ on the ends of two discharging elastic rollers, W W', and give a vertical reciprocating motion to said rollers, so that the latter may operate in conjunction with the folding-cams in the formation of the bottom seams and discharge of the bag, in the manner illustrated in the drawings, the discharging-rollers being kept against the flanges by the action of weights X attached to cords $x$, which pass over small grooved pulleys $v^4$, at the ends of the cams V V', and are secured to the journal-boxes which carry the shafts of the rollers W W'. These discharging-rollers W W' move together, being geared together, as shown in Fig. 4, so as to revolve simultaneously, and one of them is driven by gear-wheels 18, 19, and 20, the wheel 18 being upon the shaft 21, operated by a pinion, 22, from gear-wheel 23 upon the shaft of one of the folding-cams, which carries the wheel 12. The wheel 18 is linked, as shown in Fig. 3, to the wheel 19, which in turn is linked to the wheel 20 upon the roller W, so that the roller W may rise and fall without disturbing the relation between the gear-wheels which drive it. As it is necessary that these discharging-rollers shall not revolve during the formation of the bottom seams of the bag, a clutch, Y, is provided, so that the wheel 18 may be detached from its driving-shaft at the proper times. The clutch is thrown in and out, so as to connect or disconnect the wheel 18 from its shaft, by the forked and pivoted lever Z and cam $z$ on the end of shaft 17, the clutch moving upon a feather on its shaft. The paper tube fed down the guide R by the belts S S' is spread by the spring-fingers $r'$ into a flat tube, and seized at its lower end between the rolls W W', which continue to revolve and to draw the tube down until only just the required length for the formation of the satchel-bottom remains above them, when their rotation is temporarily suspended, as explained. The position of the parts at this stage is shown in Fig. 4. The side flaps of the bottom of the bag, marked $a\ a$ in Figs. 5 and 22, are folded down, preparatory to the operation of the folding-cams, by the co-operating movement of the swinging side flaps or folders $c\ c$ and spring-fingers $r'$, the former being hinged to the frame of the machine and operated in one direction by the pivoted lever $d$ and cam $d^1$ on shaft $g^6$, and in the opposite direction by the coiled spring $d^2$, the latter, $r'$, being operated by the movement inward of the said side flaps or folders $c\ c$, the movement of the two in conjunction from the position shown in Fig. 4 to the position shown in Fig. 5 serving to fold down these side flaps $a$ accurately and with a sharp corner at the sides of the bag, as shown in Fig. 5. During the progress of the rotation of the folding-cams V V' from the position shown in Fig. 5 successively to that illustrated in Fig. 6 and that exhibited in Fig. 7, the fountain paste-plunger $m$ descends, spreading the partly-folded bottom upon the rolls W W', and assisting the cams V V' to make the creases or folds indicated by broken lines in Fig. 22. The cams V V' having folded the flaps $b$ against the vertical sides of the paste-plunger $m$, the latter again rises above them, having during both its descent and ascent, applied paste at the proper points, in manner hereinafter described, and, the cams continuing to revolve, first one of the flaps, $b$, is folded down upon the rolls W W' by the cam V, and immediately afterward the other, by the cam V', as seen in Figs. 9 and 10. The next operation is performed by a reciprocating knife, V'', attached to the folding-cam V', which, as the cam revolves, is forced in between the two rollers W W', so as to double up the bottom of the bag accurately for proper delivery through the said rollers in the manner shown in Fig. 11, the knife being moved, as shown in Fig. 21, by a vibratory shaft, $f^1$, cam $f^2$, and return-spring $f^3$, the shaft being moved in one direction, so as to force out the knife, by its lever $f^4$ striking against a projection, $f^5$, on the frame of machine, and in the opposite direction by the retraction of the spring, which also draws back the knife.

Figure 7:
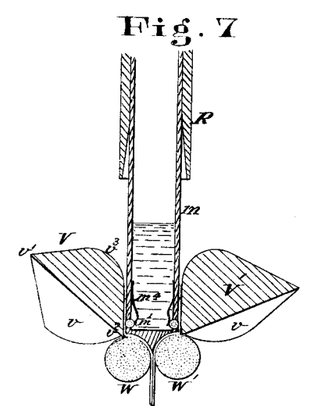
Fig. 7 is a similar section, exhibiting the parts in a more advanced stage for the formation of the bottom flaps.

In the formation of the bottom seams of the bag by the folding-cams V V' and rollers W W', paste is applied to the open face of the parts to be folded, in the manner shown, by cross-hatched lines in Fig. 22. This paste is applied by the fountain paste-plunger $m$, the bottom of which is formed to fit against the discharging-rollers W W', so as to assist in the formation of the folds $b$ of the bottom, as shown in Fig. 7. It is also of sufficient width only to move in between the folding-cams V V', as shown in Figs. 7 and 8, to turn up the folds $b$ preparatory to their being folded down by the cams V V', and, in the movement of this plunger between the said cams, the small pasting-rollers $m^1\ m^2\ m^3$, which are located near the bottom of the plunger, and held in place by the springs $m^4$, rotate slightly, and apply the paste in the manner indicated in the plan of the bottom of the bag in Fig. 22.

As before described, the plunger has a vertical reciprocating movement, and it is fed with paste through the tube M. In the operation of the rollers $m^1\ m^2\ m^3$ in applying the paste, they are pressed in against the force of the springs, and, as they revolve in the motion of the plunger up or down, they carry out fresh paste from the fountain-plunger $m$. The ends of the springs may have projecting brackets for small ends of the rollers $m^1\ m^2\ m^3$ to revolve in. The journal or journal-boxes of the shafts which carry the paper-feeding rollers have springs attached so as to pull the rollers together, and thus resist the action of the gearing to force them asunder. The provision of such springs renders the feeding positive, and permits no slippage.

The paste-roller $o$ may be operated automatically by gearing set in motion by striking a projection on the frame of the machine.

The rollers W W' are necessarily of rubber or other elastic substance, as they serve to receive the edges of the plunger $m$ for creasing, and deliver at times two thicknesses of paper, and at other times twelve thicknesses.

It will be seen that in the configuration of the cams V V' the sectional figure of each is composed of two angular projections, $v^1\ v^2$, and a connecting curve, $v^3$, concentric to the axis of the cams. This configuration not only provides for the proper operation of the cams in folding the bottom of the bag, but enables them to revolve continuously.

I claim—

1. The feed-rolls E, one of which is provided with clutch-pins $e'$, in combination with the loose and sliding driving-wheel F, having clutch-pins $f$, and the shears G G', which are connected to, and operate in conjunction with, the shifter of the driving-wheel F, substantially as and for the purpose specified.

2. The revolving tube-forming skeleton cylinder L, having a series of eccentrically-operating spindles, K $k$, and nippers $k^9$, by which the cylinder is expanded and contracted, and the paper blank grasped and formed into a tube, substantially in the manner and for the purpose specified.

3. In combination with the skeleton forming-cylinder L, carrying nippers K $k$, the fountain pasting-cylinder O $o$, connected and operating substantially in the manner and for the purpose described.

4. The combination of suspended guide R $r$ and feeding-belts S S' $s$, the latter having a movement to and from the guide, whereby the tube is fed only at positive intervals, substantially in the manner and for the purpose specified.

5. In combination with the feed-belts S S' s, the upper rollers s of which turn in horizontally-elongated bearings s', vibrating fingers T, lever V, and cam-shaft $g^6 g^3$, operating substantially in the manner and for the purpose specified.

6. In the described connection with the feeding-belts S S' s and hollow guide R r, the spring-fingers r', operating to spread the tube flat for proper delivery to the bottoming-cams and discharge-rollers after it leaves the guide R, and to assist in folding the side flaps, substantially in the manner and for the purpose specified.

7. The combination of folding-cams V V' v, elastic discharge-rollers W W', side folders c c, and pasting-plunger m, whereby the bottom of the sack is folded and pasted into a satchel-bottom and delivered, the whole being connected and operating substantially in the manner described.

8. The folding-cams V V', the cross-sectional figure of each of which presents two angular projections, $v^1$ $v^2$, and a connecting concentric curve $v^3$, substantially as and for the purpose specified.

9. The combination of bottom pasting-plunger M $m$ $m^1$ $m^2$ $m^3$, cross-head N, side rods $n$, lever $n^1$, fixed to a shaft-carrying lever $n^2$, provided with a wrist-pin, $n^3$, and cam-grooved wheel $n^4$, connected and operating substantially as and for the purpose specified.

10. In combination with the rollers W W', the clutch Y, lever Z, and cam-shaft $z$ 17, operating substantially in the manner and for the purpose specified.

11. In combination with the rollers W W' and cam V', the reciprocating knife V'', operating substantially as and for the purpose specified.

12. The forming-cylinder carrying the grasping spring-nippers $k^9$ and large feed-rolls H H', in combination with the intermediate thin feed-rolls I I', substantially as and for the purpose set forth.

13. The combination of cam-collars $v$, rollers W W', with idlers $v^4$ at the ends and journaled or sliding boxes, cords $x$, and weights X, connected and operating substantially in the manner and for the purpose described.

14. The combination of side folders c c', operating in the described connection with the cams V V', lever d, cam-shaft $g^6$ d', and spring d'', connected and operating substantially in the manner and for the purpose specified.

In testimony of which invention I hereunto set my hand.

CHARLES G. BIEDINGER.

Witnesses:
FRANK MILLWARD,
J. L. WARTMANN.